US011287600B2

(12) United States Patent
Sofka et al.

(10) Patent No.: US 11,287,600 B2
(45) Date of Patent: Mar. 29, 2022

(54) METHOD, APPARATUS, AND COMPUTER-READABLE MEDIUM FOR REDUCED ERROR IN POSITIONAL REPEATABILITY

(71) Applicant: IDEX HEALTH & SCIENCE LLC, Rochester, NY (US)

(72) Inventors: Jozef Sofka, Binghamton, NY (US); Justin VanTassel, Binghamton, NY (US); James Moronski, Vestal, NY (US)

(73) Assignee: IDEX Health & Science LLC

(*) Notice: Subject to any disclaimer, the term of this patent is extended or adjusted under 35 U.S.C. 154(b) by 907 days.

(21) Appl. No.: 14/218,131

(22) Filed: Mar. 18, 2014

(65) Prior Publication Data

US 2015/0268440 A1 Sep. 24, 2015

(51) Int. Cl.
  *G02B 7/00* (2021.01)
  *F16H 7/18* (2006.01)
  *G02B 7/16* (2021.01)
  *F16H 7/02* (2006.01)

(52) U.S. Cl.
  CPC ............ *G02B 7/005* (2013.01); *F16H 7/023* (2013.01); *F16H 7/18* (2013.01); *G02B 7/006* (2013.01); *G02B 7/16* (2013.01); *Y10T 74/1836* (2015.01)

(58) Field of Classification Search
  CPC .......... G02B 7/005; G02B 7/006; G02B 7/16; F16H 7/023; F16H 7/16; F16H 7/18; F16H 7/006; Y10T 74/1836
  USPC .......................................... 359/821; 474/139
  See application file for complete search history.

(56) References Cited

U.S. PATENT DOCUMENTS

| 1,022,606 | A | * | 4/1912 | Stahl | G02B 25/002 359/804 |
|---|---|---|---|---|---|
| 1,423,028 | A | * | 7/1922 | Roth | F16H 7/06 474/139 |
| 2,560,738 | A | * | 7/1951 | Patterson, Jr. | B23K 7/006 266/57 |
| 3,631,775 | A | * | 1/1972 | Tidd | B41B 21/16 359/821 |
| 3,762,232 | A | * | 10/1973 | Muller | F16G 3/00 474/101 |
| 5,602,681 | A | * | 2/1997 | Nakayama | G01D 5/145 324/207.21 |
| 5,617,260 | A | * | 4/1997 | McNiven | G02B 7/16 359/381 |
| 2010/0247116 | A1 | * | 9/2010 | Wiener | G03G 15/234 399/17 |

(Continued)

OTHER PUBLICATIONS

Thorlabs part FW102C, mechanical drawing of 2010.*

(Continued)

*Primary Examiner* — G. G. King

(74) *Attorney, Agent, or Firm* — Harter Secrest & Emery LLP

(57) ABSTRACT

Presented is a method, apparatus and computer-readable medium for reducing error. The apparatus includes a rotatable element having a plurality of spaced light modifying ports located at set positions in the rotatable element, the rotatable element rotatable about an axis. The apparatus further includes a drive engagedly coupled to the rotatable element to rotate the rotatable element, wherein one periodic cycle of the rotatable element is an integer number of periodic cycles of the drive.

9 Claims, 4 Drawing Sheets

(56) References Cited

U.S. PATENT DOCUMENTS

2012/0134808 A1* 5/2012 Lindberg ............... F03D 80/70
 416/1
2013/0090200 A1* 4/2013 Richardson ............. F16H 7/02
 474/139

OTHER PUBLICATIONS

Thorlabs Motorized Filter Wheel Software Manual 2012.*
Thorlabs FW102C Motorized Filter Wheel Operating Manual 2011.*
Thorlabs part FW102CW mechanical drawing 2014.*
www.youtube.com/watch?v=KD0BcFuZaB8, 2014.*
American Machinists' Handbook pp. 698-75, 1940.*
Grimshaw "Rope Drive for Power Transmission," Cassier's Magazine, vol. II, No. 7, pp. 219-225, Jul. 1892.*
Chapman "Belt Drive vs Direct Drive: a Question of Torque," http://ffden-2.phys.uaf.edu/211_fall2002.web.dir/thomas_chapman/DIRECT%20VS%20BELT.htm, archived 2003.*
Bhandari "Design of Machine Elements, Third Edition" pp. 499-501, 516 and 730-731 (Year: 2010).*

\* cited by examiner

METHOD, APPARATUS, AND COMPUTER-READABLE MEDIUM FOR REDUCED ERROR IN POSITIONAL REPEATABILITY

STATEMENT REGARDING FEDERALLY SPONSORED RESEARCH OR DEVELOPMENT

None.

REFERENCE TO A "SEQUENCE LISTING"

Not applicable.

FIELD OF THE INVENTION

Exemplary embodiments of the present disclosure relate to a method, apparatus and computer-readable medium for reducing positioning error and more particularly to a method, apparatus, and computer-readable medium for providing a reduced variation in positional repeatability.

BACKGROUND OF THE INVENTION

Distortions in viewing images can arise from inaccuracies or impurities in the viewing mechanism (e.g., telescope or lens). These distortions can be corrected or filtered out through various modifications to the viewing mechanism. However, it is important for the distortions to continually appear to the same extent or in the same place when the mechanism is moved. If a viewing mechanism moves from a start position to a second position and back to the start position, it is difficult to correct for the same distortions if the viewing mechanism does not return to the same starting position, within predetermined limits or variations.

Distortions in viewing images can also occur due to deficiencies in the calibration of images. The level to which the calibration data can correct these deficiencies depends on how closely the calibration data represents the optical system used to collect the data. However, if the components of the viewing mechanism are not returned to the exact location corresponding to the calibration configuration, the calibration data will not efficiently correct the optical system deficiencies related degradation of the science data. Therefore, the closer or more accurately the viewing mechanism returns to the same position every time the same view is desired, the better the corrections. That is, it is more difficult to correct for distortions at a given view or position if the viewing mechanism does not return to the given position within a known variance.

Numerous other fields require the ability to repeatedly position a mechanism at a certain position with reduced variance. For example, in spectroscopy it may be necessary to repeatedly position spectrometers, spectrophotometers, or spectral analyzers in various positions with little to no variance in the positioning. Other examples where reduced variance in positioning is applicable include holography, x-ray imaging, tomography, 3-D measurement, and material handling. Accordingly, there is a need for providing enhanced repeatability of positioning with reduced variance.

SUMMARY OF THE INVENTION

In view of the foregoing, it is an object of the present invention to provide a method, apparatus and computer-readable medium for reduced positional error.

A first exemplary embodiment provides an apparatus. The apparatus includes a rotatable element having a plurality of spaced light modifying ports located at set positions in the rotatable element, the rotatable element rotatable about an axis. The apparatus further includes a drive engagedly coupled to the rotatable element to rotate the rotatable element, wherein one periodic cycle of the rotatable element is an integer number of periodic cycles of the drive.

A second exemplary embodiment provides a method of reducing error. The method includes rotating, by a drive, a rotatable element having a plurality of spaced light modifying ports located at set positions in the rotatable element about an axis from a starting position to a predetermined position. The method further includes returning, by the drive, the rotatable element to the starting position, wherein one periodic cycle of the rotatable element is an integer number of periodic cycles of the drive.

A third exemplary embodiment provides a non-transitory computer-readable medium tangibly comprising computer program instructions which when executed on a processor causes the processor to at least rotate, by a drive, a rotatable element having a plurality of spaced light modifying ports located at set positions in the rotatable element about an axis from a starting position to a predetermined position. The computer program instructions which when executed on the processor further causes the processor to return, by the drive, the rotatable element to the starting position, wherein one periodic cycle of the rotatable element is an integer number of periodic cycles of the drive.

A fourth exemplary embodiment provides an apparatus for calibrating. The apparatus includes a rotatable element, a drive, at least one processor and a memory storing a set of computer instructions, the processor configured to cause the apparatus to at least rotate, by the drive, the rotatable element having a plurality of spaced light modifying ports located at set positions in the rotatable element about an axis from a starting position to a predetermined position. The apparatus is further caused to return, by the drive, the rotatable element to the starting position, wherein one periodic cycle of the rotatable element is an integer number of periodic cycles of the drive.

A fifth exemplary embodiment provides a method of calibrating. The method includes loading a rotatable element having a plurality of spaced light modifying ports located at set positions in the rotatable element to a housing with a drive. The method further includes determining a position of the plurality of spaced light modifying ports, wherein one periodic cycle of the rotatable element is an integer number of periodic cycles of the drive.

The following will describe embodiments of the present invention, but it should be appreciated that the present invention is not limited to the described embodiments and various modifications of the invention are possible without departing from the basic principle. The scope of the present invention is therefore to be determined solely by the appended claims.

BRIEF DESCRIPTION OF THE SEVERAL VIEWS OF THE DRAWING(S)

DETAILED DESCRIPTION OF THE INVENTION

Exemplary embodiments of the present disclosure include an open-loop rotary drive that returns to the same position after completing a full revolution. Exemplary embodiments of the present disclosure allow for the system to repeatedly arrive at the same position regardless of any drive component inaccuracies. Exemplary embodiments are also particularly suitable for simple open-loop drive designs (e.g., ones driven by stepper motors).

Figure 1:
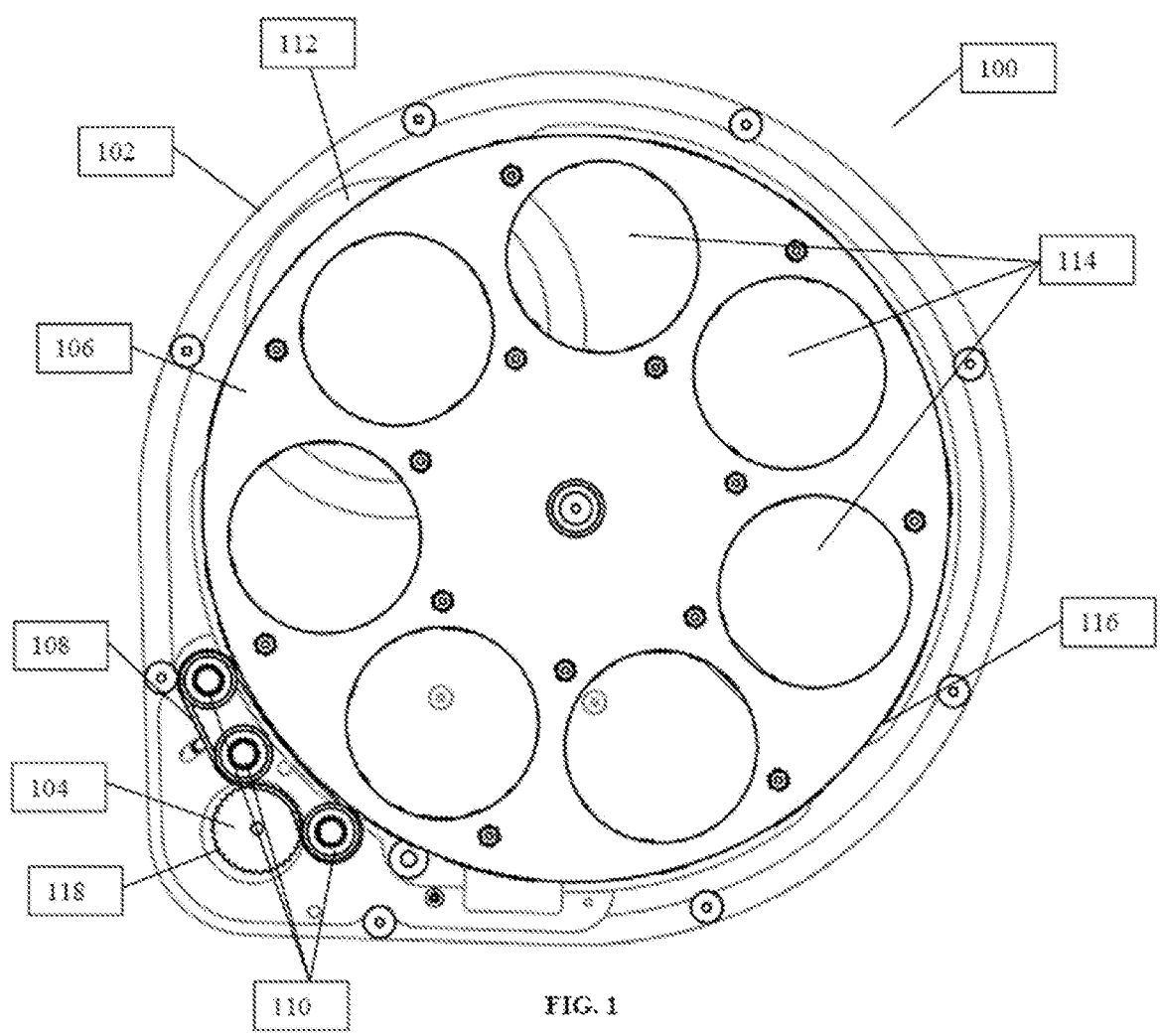
FIG. 1 is a top view of a configuration of a device suitable for use in practicing exemplary embodiments of this invention.

Referring to FIG. 1, provided is an exemplary embodiment of a device for practicing exemplary embodiments of this disclosure. Shown in FIG. 1 is device 100, a housing 102, a motor or drive 104, a wheel 106, a synchronous belt 108, and rotatable members 110.

Housing 102 can be made out of any type of metal, metal alloy, aluminum alloy, or plastic. Housing 102 is preferably constructed out of a material that is both rigid and allows for other elements of device 100 to be attached or affixed to housing 102. FIG. 1 illustrates an exemplary embodiment of housing 102 which is in a teardrop shape. It can be appreciated that exemplary embodiments of housing 102 provide for housing 102 to be many shapes and sizes including circular and rectangular shapes. Exemplary embodiments of housing 102 provide for a port 112. Port 112 is an opening on housing 102, which can align with some or all of the light modifying ports or openings 114 of wheel 106. Exemplary embodiments of port 112 provide for numerous types of shapes and sizes such as circular or rectangular shapes. It can be appreciated that exemplary embodiments of housing 102 provide for both multiple ports 112 or in some cases zero ports 112.

Exemplary embodiments of wheel 106 provide that wheel 106 is coupled, held or attached to housing 102 such that it can rotate about an axis at its center. In other embodiments wheel 106 is attached to housing 102 such that it rotates about an axis not at its center. Wheel 106 as shown in FIG. 1 is in a thin circular shaped plate. However, it can be appreciated that exemplary embodiments of wheel 106 also include other configurations of rotatable elements or rotatable plates that are in multiple shapes/peripheries (e.g., rectangular, triangular or circular) and sizes. Wheel 106 can be made of any type of metal, metal alloy, aluminum alloy or plastic.

Wheel 106 in some configurations contains light modifying ports or openings 114. Exemplary embodiments of wheel 106 can include both multiple and zero light modifying ports or openings 114. Embodiments of light modifying ports or openings 114 provide that they of the size and shape to retain optical components. Some examples of optical components include lenses and light filters. In some embodiments light modifying ports or openings 114 are equally radially spaced or circumferentially spaced equally or staggered from the center of wheel 106. In other embodiments light modifying ports or openings 114 are not equally spaced from one another and are not equally spaced radially from the center of wheel 106.

In the embodiment shown in FIG. 1, wheel 106 includes teeth or interlocking notches 116 along its periphery. In other embodiments wheel 106 can include teeth or interlocking notches 116 along a circular element with a fixed radius from the center of wheel 106 protruding vertically from the face of wheel 106. In yet another embodiment wheel 106 can have a smooth or rough surface along its periphery.

Exemplary embodiments of motor or drive 104 provide that it is attached or held in the housing 102. Motor or drive 104 can include both electric, gas or stepper motors. Motor or drive 104 can be any type of powering device capable of rotating drive 104, wheel 106 and synchronous belt 108. Exemplary embodiments of motor or drive 104 provide that motor or drive 104 can also engage, power or rotate additional intermediate drive components. Exemplary embodiments of intermediate drive components include pulleys, belts, rotating devices, idlers and the like.

Motor or drive 104 as shown in FIG. 1 includes teeth or interlocking notches 118 along its periphery. In some embodiments teeth or interlocking notches 118 are contained along a circular element with a fixed radius from the center of drive 104 protruding vertically from the face of motor or drive 104. In an alternative embodiment, motor or drive 104 does not contain any teeth or interlocking notches 118, but has a smooth or rough surface along its periphery. Exemplary embodiments of motor or drive 104 provide that motor or drive 104 can rotate and engage wheel 106 either directly or through synchronous belt 108. Motor or drive 104 is configured such that when it is engaged with wheel 106, one periodic cycle or one full revolution of wheel 106 corresponds to an integral number of periodic cycles of motor or drive 104.

As shown in FIG. 1, device 100 also includes synchronous belt 108. Synchronous belt 108 is an exemplary embodiment of an intermediate drive component. In other embodiments an intermediate drive component can be one or multiple belts or pulleys capable of engaging motor or drive 104 and wheel 106.

Synchronous belt 108 as shown in FIG. 1 is held in place by three rotatable members 110. Exemplary embodiments of rotatable members 110 provide that they can be pulleys or idlers that are attached or affixed to housing 102 such that rotatable members 110 can freely rotate about an axis at their center. Additionally, rotatable members 110 serve the purpose of maintaining tension in synchronous belt 108 to enable synchronous belt 108 to engage motor or drive 104, wheel 106 or other intermediate drive components.

Exemplary embodiments of synchronous belt 108 provide for teeth or interlocking notches on its outward face such that they can engage and lock with teeth or interlocking notches 116 on wheel 106 and teeth or interlocking notches 118 on motor or drive 104. Embodiments of synchronous belt 108 are configured such that one periodic cycle of wheel 106 corresponds to an integral number of cycles of synchronous belt 108. Likewise, any additional intermediate drive components are configured such that one periodic cycle of wheel 106 corresponds to an integral number of cycles for any of the additional intermediate drive components. For example, if wheel 106 has 80 teeth or interlocking notches 116, the synchronous belt 108 could have 10, 20, or 40 teeth or interlocking notches along its outside edge.

In other exemplary embodiments of synchronous belt 108, there are teeth or interlocking notches on both sides of synchronous belt 108. Additionally, synchronous belt 108 in another embodiment may be smooth on both sides.

Synchronous belt 108 as shown in FIG. 1 performs the role of transferring rotational movement from motor or drive 104 to wheel 106. This is accomplished by engaging motor or drive 104 such that it rotates. This in turn rotates synchronous belt 108, which in turn rotates wheel 106.

The integral correspondence between the motor or drive 104, wheel 106 and synchronous belt 108 causes all of the components to reorient to the same positions when wheel 106 returns to the same position. This occurs even after wheel 106 completes a full revolution. Furthermore, the integral correspondence of all of the components (i.e., drive 104, wheel 106 and synchronous belt 108) allows for the components to all return to the same position without repeatability being affected by the components' individual manufacturing inaccuracies. That is, the variance within a cycle of each individual component is removed or cancelled by the correspondence between the periodic cycle of the individual components.

In another embodiment, the teeth or interlocking notches 116 of wheel 106 can be manufactured with backlash-free engagement with the synchronous belt 108. The synchronous belt 108 can be double sided, in which case the rotatable members 110 would be idling pulleys. The motor or drive 104 could be engaged with either side of the synchronous belt 108.

Exemplary embodiments of this disclosure provide that synchronous belt 108 is particularly suitable for these teachings, although the benefits of this disclosure are applicable to other power transfer methods (chains, gears, pulleys, idlers, etc.).

In yet another embodiment, motor or drive 104 can be connected and operated through a single or multiple processors. The processor can be contained within housing 102 of device 100. Alternatively, the processor can be contained in an external device connected to device 100 such that the processor can control the speed, direction and acceleration of motor or drive 104. In another embodiment, device 100 can be operably connected to a computer or personal computer (PC). A computer program on the PC can control the functions of motor or drive 104.

Figure 2:
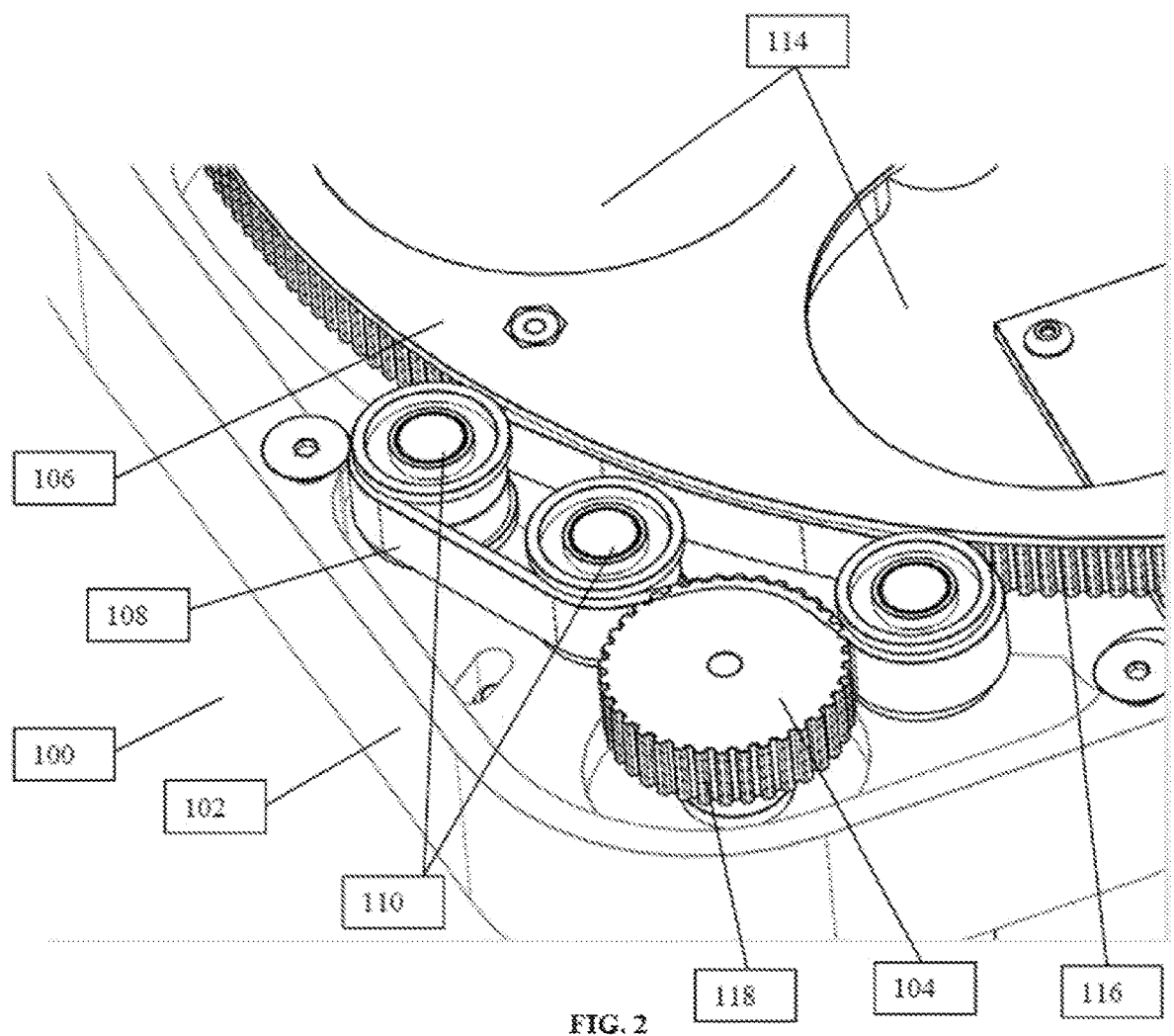
FIG. 2 is a close up view of a configuration of parts of a device suitable for use in practicing exemplary embodiments of this invention.

Referring to FIG. 2, presented is an illustration of a configuration of parts of device 100 suitable for use in practicing exemplary embodiments of the present disclosure. Shown in FIG. 2 is device 100 with housing 102, motor or drive 104, wheel 106, synchronous belt 108, and rotatable members 110.

Motor or drive 104 as illustrated in FIG. 2 has teeth or interlocking notches 118 along its periphery or outside edge. In other embodiments, teeth or interlocking notches 118 are contained along a circular element with a fixed radius from the center of drive 104 protruding vertically from the face of motor or drive 104. In an alternative embodiment, motor or drive 104 does not contain any teeth or interlocking notches 118, but has a smooth or rough surface along its periphery. Motor or drive 104 is attached to housing 102 and is engagedly coupled to synchronous belt 108. As shown in FIG. 2, in one configuration synchronous belt 108 is maintained by being wrapped around three rotatable members 110 which are attached to housing 102. In this depiction in FIG. 2 this embodiment of synchronous belt 108 does not have any teeth or interlocking notches, but has a smooth surface. Synchronous belt 108 is engagedly attached to rotate wheel 106 when rotated. Wheel 106 as shown in FIG. 2 has teeth or interlocking notches 116 that engage with synchronous belt 108.

Wheel 106 as shown in FIG. 2 also contains multiple light modifying ports or openings 114 for maintaining different types of optical components, such as lenses or filters. In this embodiment in FIG. 2, one periodic cycle or one full revolution or rotation of wheel 106 corresponds to an integral number of revolutions of motor or drive 104 and synchronous belt 108. It can be appreciated that motor or drive 104 and synchronous belt 108 as well as any other intermediate drive components need not have the same number of revolutions for every one periodic cycle of wheel 106 as long as one periodic cycle of wheel 106 corresponds to an integral number of cycles for each component.

Exemplary embodiments of this disclosure provide that synchronous belt 108 can be elastic. This can create locational error, known as backlash, when motor or drive 104 is started, stopped or when there is a change of rotational direction. In essence, the elasticity of synchronous belt 108 can create a small time period wherein motor or drive 104 will be moving but synchronous belt 108 will not be moving. Backlash can be corrected through preloading. Exemplary embodiments of device 100 provide for the application of pressure or tension to be employed on synchronous belt 108 to removing any slack from synchronous belt 108. This is shown by example in FIG. 1 through the use of rotatable members 110 which remove any slack in synchronous belt 108 and maintain a constant pressure or tension.

Figure 3:
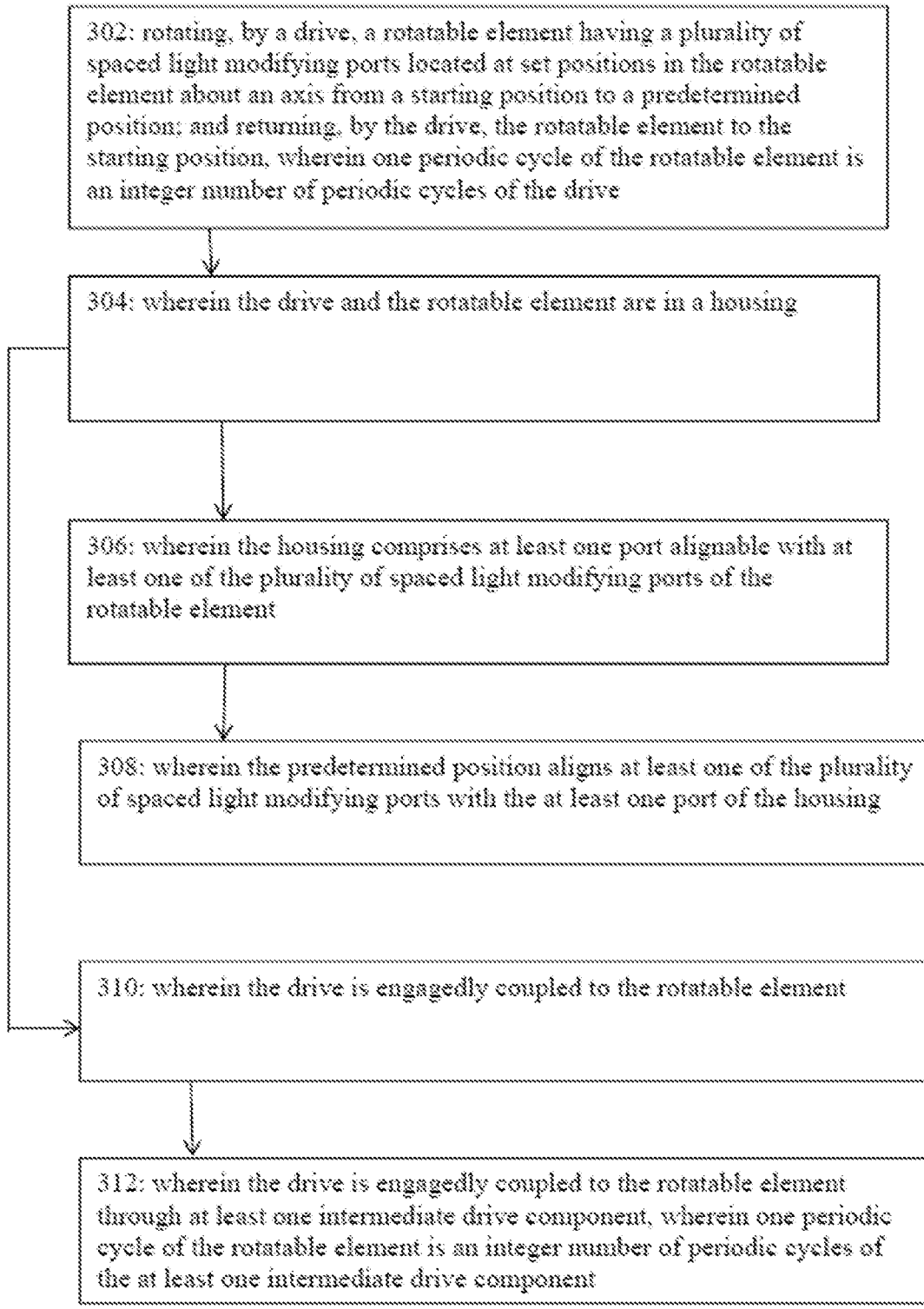
FIG. 3 is a logic flow diagram in accordance with a method, apparatus, and computer-readable medium for performing exemplary embodiments of this invention.

FIG. 3 presents a summary of a method of the above teachings for reducing error in the movement of parts of a device or apparatus. Block 302 presents rotating, by a drive, a rotatable element having a plurality of spaced light modifying ports located at set positions in the rotatable element about an axis from a starting position to a predetermined position; and returning, by the drive, the rotatable element to the starting position, wherein one periodic cycle of the rotatable element is an integer number of periodic cycles of the drive. The method proceeds to block 304, which specifies further wherein the drive and the rotatable element are in a housing.

Some of the non-limiting implementations detailed above are also summarized at FIG. 3 following block 304. Block 306 relates to further wherein the housing comprises at least one port alignable with at least one of the plurality of spaced light modifying ports of the rotatable element. Then at block 308 it is specified wherein the predetermined position aligns at least one of the plurality of spaced light modifying ports with the at least one port of the housing.

Proceeding from block 304, at block 310 it is further detailed that wherein the drive is engagedly coupled to the rotatable element. Finally, at block 312 it is specified wherein the drive is engagedly coupled to the rotatable element through at least one intermediate drive component, wherein one periodic cycle of the rotatable element is an integer number of periodic cycles of the at least one intermediate drive component.

Thus, the present disclosure allows for a rotatable element to be moved or rotated from one position to another and back such that all of the other elements (i.e., drive and intermediate drive components) also begin and end at the same absolute position.

The logic flow diagram of FIG. 3 may be considered to illustrate the operation of a method, and a result of execution of computer program instructions stored in a computer-readable medium, and a specific manner in which components of a device are configured to cause that device to operate. The various blocks shown in FIG. 3 may also be considered as a plurality of coupled logic circuit elements constructed to carry out the associated function(s), or specific result of strings of computer program instructions or code stored in a memory.

Figure 4:
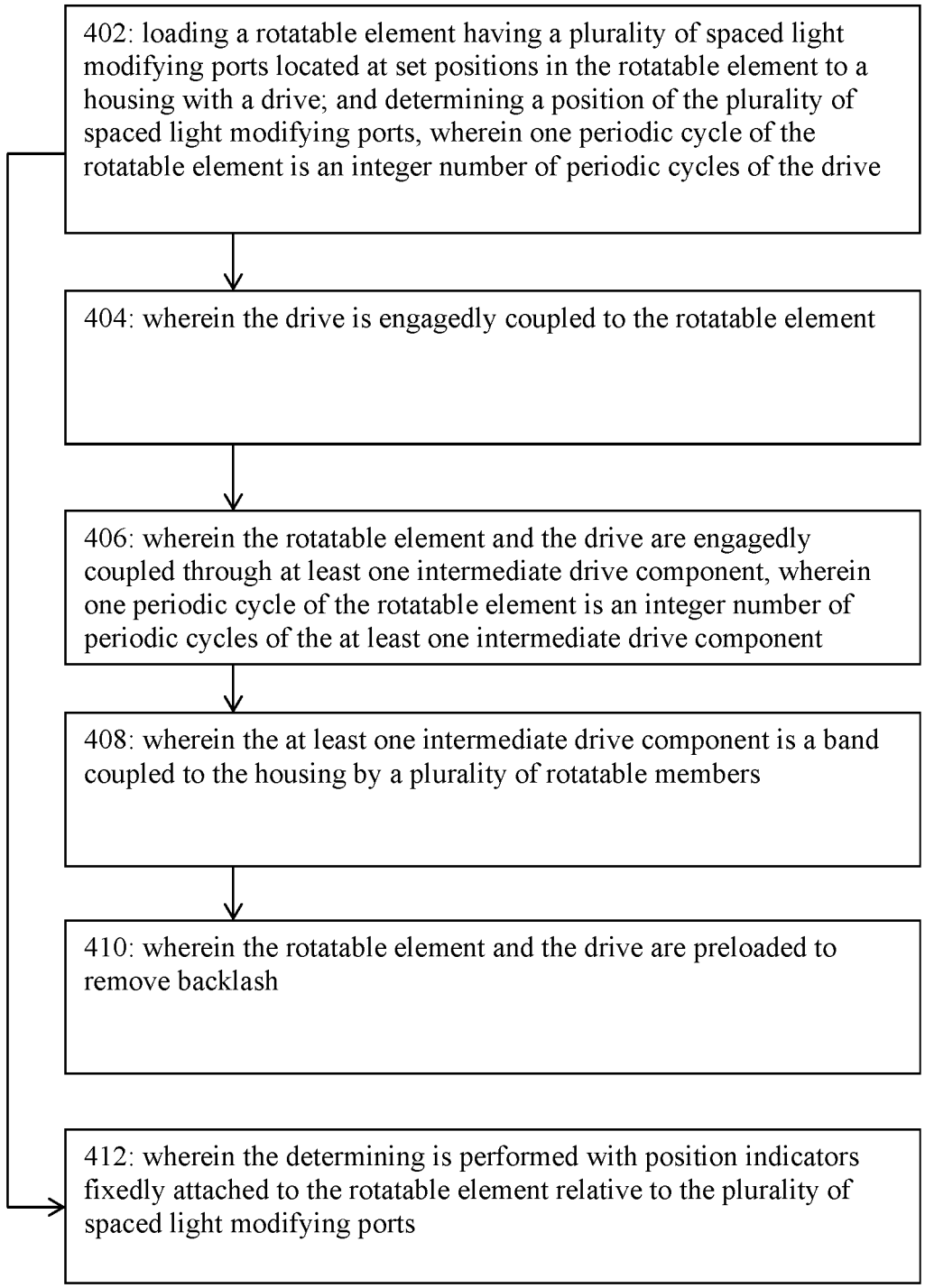
FIG. 4 is a logic flow diagram in accordance with another method, apparatus, and computer-readable medium for performing exemplary embodiments of this invention.

Referring to FIG. 4, presented is a summary of the above teachings for calibrating a device or apparatus. Block 402 presents loading a rotatable element having a plurality of spaced light modifying ports located at set positions in the rotatable element to a housing with a drive; and determining a position of the plurality of spaced light modifying ports, wherein one periodic cycle of the rotatable element is an integer number of periodic cycles of the drive. Then at block 404 it is specified wherein the drive is engagedly coupled to the rotatable element.

Following block 404, block 406 specifies further wherein the rotatable element and the drive are engagedly coupled through at least one intermediate drive component, wherein one periodic cycle of the rotatable element is an integer number of periodic cycles of the at least one intermediate drive component. Block 408 continues by stating wherein the at least one intermediate drive component is a band coupled to the housing by a plurality of rotatable members.

The method continues at block 410 which specifies wherein the rotatable element and the drive are preloaded to remove backlash. Finally, proceeding from block 402, block 412 specifies that wherein the determining is performed with position indicators fixedly attached to the rotatable element relative to the plurality of spaced light modifying ports.

Therefore, embodiments of the present disclosure also provide for a method of calibrating a device by determining through the use of position indicators 120 (not shown), such as magnets or magnetic fields, the location or position of light modifying ports.

The logic flow diagram of FIG. 4 may be considered to illustrate the operation of a method, and a result of execution of computer program instructions stored in a computer-readable medium, and a specific manner in which components of an electronic device are configured to cause that electronic device to operate. The various blocks shown in FIG. 4 may also be considered as a plurality of coupled logic circuit elements constructed to carry out the associated function(s), or specific result of strings of computer program instructions or code stored in a memory.

Various embodiments of the computer readable medium include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors, digital signal processors and multi-core processors.

Applications of exemplary embodiments of this disclosure are applicable to areas where repeatable positioning is necessary, such as switching filters in multi-wavelength imaging, spectroscopy, holography, x-ray, tomography, 3-D measurement, and material handling.

For example, it may be necessary for parts of a spectrometer to take a radiation intensity measurement at a first position and then move from the first position to a second position to take a second measurement of radiation intensity. Then the spectrometer may need to return to the first position and take another measurement of the radiation intensity at the first position. Exemplary embodiments of the present disclosure provide that this can be accomplished with reduced variance by having an integral correspondence between the different drive mechanisms within the spectrometer.

What is claimed is:
1. An apparatus comprising:
(a) a rotatable element having a plurality of spaced light modifying ports located at set positions in the rotatable element, the rotatable element rotatable about an axis;
(b) a first drive engagedly coupled to the rotatable element to rotate the rotatable element, wherein one periodic cycle of the rotatable element is an integer number of periodic cycles of the first drive; and
(c) intermediate drive components comprising a band and two separate rotatable members, wherein the intermediate drive components are separate from the first drive and engagedly coupled between the rotatable element and the first drive, wherein one periodic cycle of the rotatable element is an integer number of periodic cycles of the at least one of the intermediate drive components, and wherein the separate rotatable members are coupled by the band, and wherein one periodic cycle of the rotatable element corresponds to a first integer number of cycles of the first drive and a different second integer number of cycles of the band.

2. The apparatus according to claim 1, wherein the apparatus further comprises a housing for the rotatable element and the first drive.

3. The apparatus according to claim 2, wherein the housing comprises at least one port alignable with at least one of the plurality of spaced light modifying ports of the rotatable element.

4. The apparatus according to claim 1, wherein the band is coupled to the housing by the rotatable members.

5. The apparatus according to claim 4, wherein the plurality of spaced light modifying ports are able to maintain optical components for modifying light.

6. The apparatus according to claim 4, wherein the rotatable element and the first drive are preloaded by the band to remove backlash.

7. The apparatus according to claim 1, wherein the apparatus further comprises at least one processor operably connected to the first drive.

8. The apparatus of claim 1, wherein the band includes an outer circumference having an area of contact with the rotatable element and an area of contact with the first drive.

9. The apparatus of claim 8, wherein each area of contact with the rotatable element and the first drive is concave.

* * * * *